(No Model.)

F. HILDEBRANDT.
PETROLEUM COOKING STOVE.

No. 382,425. Patented May 8, 1888.

WITNESSES:
A. Schehl.
Carl Karp.

INVENTOR.
Fredrick Hildebrandt.
BY
Goepel & Raegener
ATTORNEYS.

N. PETERS, Photo-Lithographer, Washington, D. C.

UNITED STATES PATENT OFFICE.

FREDRICK HILDEBRANDT, OF NEW YORK, N. Y.

PETROLEUM COOKING-STOVE.

SPECIFICATION forming part of Letters Patent No. 382,425, dated May 8, 1888.

Application filed February 21, 1887. Serial No. 228,299. (No model.)

*To all whom it may concern:*

Be it known that I, FREDRICK HILDEBRANDT, of the city, county, and State of New York, have invented certain new and useful Improvements in Petroleum Cooking-Stoves, of which the following is a specification.

In the petroleum cooking-stoves heretofore in use a water-pan has been employed by which the heat of the wick-tube was prevented from being transmitted to the oil-fount of the stove. The water-pan was connected with many objectionable features, as most frequently it was not filled with water at all, so that the very object of the same was defeated, while it formed, furthermore, a collecting receptacle for dirt and drippings, which imparted to the stove an untidy appearance.

The object of this invention is to dispense with the water-pan in petroleum cooking-stoves, and to substitute for the water-cooling of the wick-tubes the cooling of the same by a continuous current of air supplied to the space around the wick-tubes; and the invention consists of a petroleum cooking-stove which is provided around the wick-tubes with a perforated pan that is supported at some distance above the oil-fount, said pan being perforated at the bottom and sides for the free circulation of the air, and closed at the upper part by a guard-cone, as will appear more fully hereinafter, and finally be pointed out in the claim.

Figure 1:
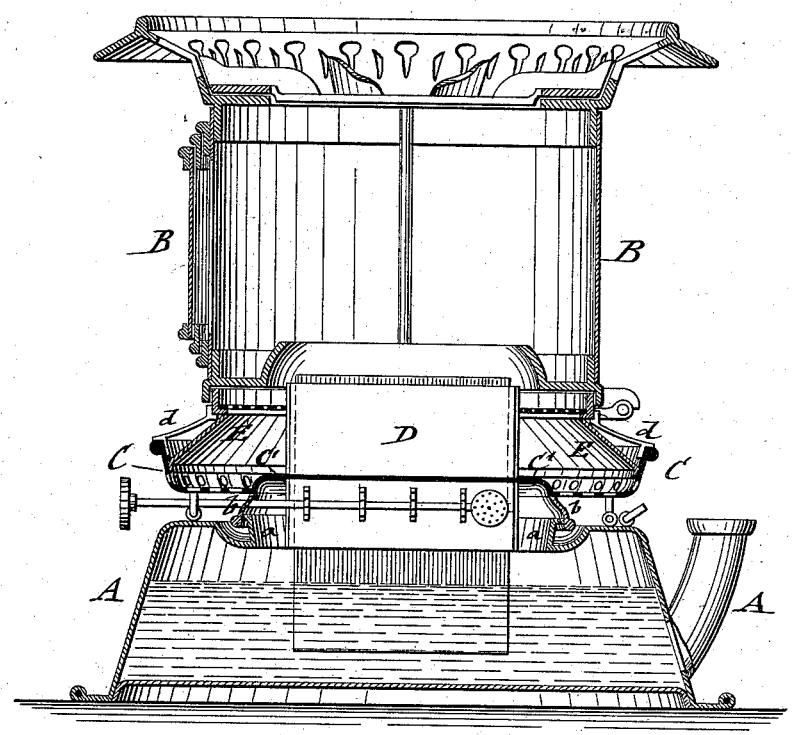
Figure 2:
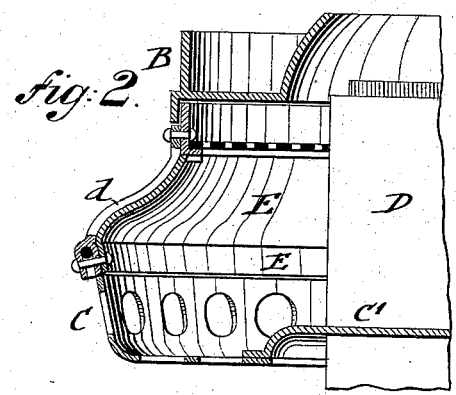

In the accompanying drawings, Figure 1 represents a vertical central section of my improved cooking stove; and Fig. 2 is a detail section, showing the perforated pan and its protecting-cone on a larger scale.

Similar letters of reference indicate corresponding parts.

In the drawings, A represents the oil-fount of a petroleum cooking-stove of the usual construction. The top part, B, is supported at some distance above the oil-fount in a detachable manner according to my Patent No. 236,813, dated January 18, 1881. At the lower part or base of the top part, B, is arranged a pan, C, which is provided with perforations in its bottom and sides, said perforations being arranged in a circle around a middle imperforate raised portion, C', through which the wick-tubes D extend, the raised portion giving sufficient space for the wick-ratchets, as shown in Fig. 1. From the middle raised portion, C', extends in downward direction an annular flange, b, that is seated on a flange of the oil-fount a, so that the surface of contact between the base of the top part and the top of the oil-fount is as small as possible, as will appear more fully by my prior patent heretofore referred to. By the air-space formed between the pan C and the oil-fount, as well as by the free circulation of air through the perforated pan C, the wick-tubes are kept cool, as they are constantly surrounded by cooling-currents of air. The top part, B, is supported on the pan C by legs *d d*, said top part, E, being of the usual construction as customary in oil-stoves of this class. Between the upper edge of the pan C and the lower edge of the top part, C', is interposed an annular piece of sheet metal, E, which forms a guard-cone for the pan C, as it prevents the dripping of extraneous matter into the pan, and thereby the choking up of the openings in the same, which are to be kept intact, so as to keep up the free and full circulation of the air around the wick-tubes. The guard-cone E also assists in the upward draft of air through the side and bottom openings of the pan C, by which upward draft the combustion of oil is rendered more perfect, owing to the increased supply of fresh air furnished to the flame or flames. The joint action of the perforated pan and guard-cone keeps the wick-tubes cool, so as to dispense with water-cooling, while the collection of impurities, drippings, &c., is prevented by the use of the guard-cone.

Having thus described my invention, I claim as new and desire to secure by Letters Patent—

In a petroleum cooking stove, the combination, with an oil-fount, of a pan supported on said fount and provided with side and bottom apertures, a detachable top part supported on said pan, and a closed guard-cone extending from the rim of the pan to the lower edge of the top part, substantially as set forth.

In testimony that I claim the foregoing as my invention I have signed my name in presence of two subscribing witnesses.

FREDRICK HILDEBRANDT.

Witnesses:
PAUL GOEPEL,
CARL KARP.